United States Patent [19]
Zabka

[11] Patent Number: 5,223,955
[45] Date of Patent: Jun. 29, 1993

[54] REFLECTION INTEGRAL HOLOGRAPHY

[76] Inventor: James B. Zabka, 5 Camino el Alto, Albuquerque, N. Mex. 87123

[21] Appl. No.: 905,341

[22] Filed: Jun. 29, 1992

Related U.S. Application Data

[63] Continuation-in-part of Ser. No. 621,255, Nov. 29, 1990, abandoned.

[51] Int. Cl.⁵ .......................... G03H 1/04; G03H 1/26
[52] U.S. Cl. .......................................... 359/8; 359/23; 359/30; 359/35; 359/900
[58] Field of Search ........................ 359/1, 3, 8, 21, 22, 359/23, 25, 26, 30, 31, 35, 900

[56] References Cited

U.S. PATENT DOCUMENTS

| | | | |
|---|---|---|---|
| 3,758,649 | 9/1973 | Frattarola | 359/3 |
| 4,206,965 | 6/1980 | McGrew | 359/9 |
| 4,364,627 | 12/1982 | Haines | 359/23 |
| 4,411,489 | 10/1983 | McGrew | 359/23 |
| 4,429,946 | 2/1984 | Haines | 359/22 |
| 4,834,476 | 5/1989 | Benton | 359/23 |
| 5,046,792 | 9/1991 | Zabka | 359/26 |

Primary Examiner—Bruce Y. Arnold
Assistant Examiner—David R. Parsons
Attorney, Agent, or Firm—DeWitt M. Morgan

[57] ABSTRACT

Apparatus and method for storing holographic synthesized information for reflection integral Bragg holograms, free of the limitations of dispersing elements (such as unilateral diffusing screens, conventional lenticular screens and Fresnel lenses), multiple reference beams, mirrorized indexing or other similar materials or techniques. These holograms accurately satisfy Bragg's condition, provide an expanded (and essentially normal) vertical viewing range and can be displayed both flat (in which case the image is behind the film plane) or concave towards the viewer (in which case the image is in front of the film plane). Flat and curved holograms can be combined together. The final holographic images are produced directly from motion picture film, without intermediate transfer prints as required by the prior art. All are front illuminated. By curving the developed hologram for viewing a high definition projection image is obtained.

22 Claims, 7 Drawing Sheets

REFLECTION INTEGRAL HOLOGRAPHY

This is a continuation-in-part of copending application(s) Ser. No. 07/621,255 filed on Nov. 29, 1990, now abandoned.

BACKGROUND OF THE INVENTION

Over the past two decades many methods of synthesizing integral holograms have been investigated. These include transmission, image plane, projection and reflection integrals. Holograms of the integral type were first discussed in literature by Robert Pole of IBM in 1967. A number of improvements were advanced over the next several years. The most notable of these were developed by the Multiplex Company in 1969-1973; a group of individuals including Britton Zabka.

Reflection holograms are formed when the reference and object beams are on opposite sides of the holographic medium during the hologram forming process. Transmission holograms are formed when the reference and object beams are on the same side of the recording medium; the object beam on axis, the reference beam off axis. The reflection hologram has been variously referred to as a reflection integral, a composite reflection hologram, a holographic reflection stereogram, Bragg's angle hologram, a volume hologram, or an amplitude hologram.

As those trained in the art will appreciate, an integral hologram is made by running film images through an optical printer. In such a process, each frame of the film is projected through condensing optical elements which condenses the associated image down to a narrow vertical beam with a length corresponding to one of the sides of the finished hologram. This was initially done with a single double convex oil lens at Multiplex. This narrow beam is focused near the plane of holographic recording medium. The reference beam is brought in from the same side and an individual condensed slit or strip hologram is formed. Each succeeding frame of film used to form the hologram is made into a slit hologram, and sequentially laid down on the recording medium by slightly moving the recording medium between each exposure. When the resultant hologram composite is processed and then back illuminated with white light it reveals each individual strip hologram conveying an image which is two dimensional. However, each eye sees a slightly different slit and the viewer perceives a three dimensional image.

A conventional reflection hologram acts as a resonant reflective filter, both angle and wavelength specific, absorbing light while acting as wavelength filter, unlike transmission integrals that are capable of constructively diffracting light through the same areas with many wavelengths and that ordinarily do not filter light.

The Bragg or reflection hologram occurs because the object beam and reference beam approach on opposite sides of the recording medium. The superimposition of these two beams creates interference fringes which are extremely close together, caused by great angular separation at approximately one half of a wavelength of light. These fringes are so close and numerous that this hologram selectively reinforces one color wavelength at the same time playing back an image. The Bragg condition is only met for one wavelength which matches up to the precise spacing between wavelengths; all others are absorbed, as those trained in the art will appreciate.

Reflection integrals formed through conventional reflection synthesis produces a hologram with a severely reduced vertical viewing range, inadequate for displayed viewing.

Producing a high diffraction efficient reflection integral hologram with a normal vertical viewing range, that can also be displayed flat without distortion has been attempted by using screen techniques, multiple mechanized positioning of reference beams and other techniques. See, for instance, U.S. Pat. No. 4,411,489 (at column 12, lines 15-70, and column 13, lines 1-30) and U.S. Pat. No. 4,834,476 (at column 7, lines 31-42). However, the concept of dispersing the object and reference beams by conventional lenticular screens or similar dispersive transmissive or reflective optical elements adjacent to or in contact with the recording medium during hologram synthesis is not found appropriate for display applications, because it is beset with built-in limitations, as discussed below.

Even high quality optical elements are not free from irregularities in their surfaces, which may include fringe height variations, deviations, absorption, indexing, dispersion differences, or other errors and flaws. These optical elements, when put near or in contact with holographic emulsion that intercepts the recording light waves, reduces the imaging ability by refracting the recording light into slightly incorrect directions, which reduce the resultant holograms' diffraction efficiency, amplitude and clarity. The reflection integral wave synthesis requires optimization of Bragg's condition for best display applications.

Diffraction is reinforced by reflection by a series of accurately spaced planes formed by the object and reference beams which correspond to the wavelength and angular orientation. The angle at which this reinforcement occurs is Bragg's angle. When the wavelength of the object beam deviates even slightly, diffraction efficiency drops considerably, as those trained in the art will appreciate. Obviously very small imperfections whose refractive indexes differ only slightly from the rest of the optical elements have powerful effects in altering the image adversely. The slightest aberrations threaten the fidelity of the finished hologram. When dispersion elements diffuse wavefronts of coherent light, the phase undulations of the diffuse wavefront become amplitude variations which hinder the high clarity and contrast, and lower diffraction efficiency. The dispersion elements also rearrange beam amplitude and phase as they travel through or are reflected from these elements. The result is to limit or distort the hologram that is ultimately recorded. This disadvantage is compounded using a Fresnel reflection element because both reference and object rays will be dispersed.

U.S. Pat. No. 4,206,965, col. 12, lines 53-55 encourages mirrorized indexing of the resultant hologram to enhance brightness lost by use of dispersing elements. That mirrorizing is a well known technique is also evidenced by U.S. Pat. No. 3,758,649, noting col. 7, lines 7-11. Volume integral reflection holograms produce unwanted bands, called Newton Rings, caused by the interference synthesized from beams illuminating opposite sides of recording medium. These rings are properly indexed and eliminated by a black backing for the resultant hologram. Mirrorization, on the other hand, reflects them back to viewer, as those trained in the art will appreciate. Furthermore, mirrorization is unnecessary with a process, such as disclosed and claimed herein, which eliminates the need for dispersing elements.

U.S. Pat. No. 4,206,965, col. 8, lines 24-60, refers to mechanical multiple reference beam positioning per strip synthesis. For flat display purposes, this exhibits several disadvantages. The synthesis of reflection holograms are greatly prone to the effects of vibration by a higher factor than most any other types of holographic synthesis. Lengthy printing times are thus required because of the need to dampen factors introduced by moving the reference beam during hologram synthesis.

SUMMARY

In contrast to the foregoing, preferred hologram synthesis depends on high clarity and contrast of interference fringes plus the greatest light power by diffraction into the narrowest possibly bandwidth when forming holograms. This produces bright and clear preferred synthesis.

These objectives (i.e., high clarity and contrast of the interference fringes) are highly interrelated. A non-diffused object beam produces the image amplitude which is holographically correct. The unbroken continuity of all light propagation from original object information to final absorption at the recording medium, allows the recording emulsion to record far more information accurately satisfying Bragg's condition.

These desired results are achieved by a method and apparatus for storing holographic synthesized information for reflection integral holograms, freed from the limitations of conventional dispersing elements, multiple reference beam exposures, mirrorized indexing, or other similar materials or techniques. At the same time the invention provides for the widening of the previously severely narrowed vertical viewing range to a normal viewing range. Furthermore, only one reference beam angle is utilized. The resultant hologram can be displayed flat or concave toward the viewer, both with front illumination.

The unique method of achieving these desired capabilities includes the step of curving the transparent recording medium about a, typically, horizontal axis, which axis is perpendicular to the line focus formed by condensing optical elements. The radius of curvature is convex with respect to the object beam and concave with respect to the reference beam. The method also includes the use of at least one and usually a pair of condensing optical elements. The advantages of this system are, first it forms the standing waves from the superimposition of reference and object beams through the curved emulsion permitting proper holographic synthesis because the beams are not being interrupted by any dispersing elements. Thus, the unobstructed beam paths of both the object and reference beams can more easily satisfy Bragg's condition, matching wavelength up to the precise spacing between them and cause the desired interference to be very high at the recording medium. The beams are mutually coherent, greatly affecting the amplitude of the wave formation. It is apparent that the intermodulation noise is greatly minimized due to the fact that the surface formed by mutual points are near perpendicular to the desired set. All the waves are in phase and therefore add amplitude, resulting in a strong wavefront reconstruction. An intense reflection occurs in reconstruction, which both diffracts and reflects light, since each ray of reconstruction light penetrates through many planes.

It is believed that the interference pattern forms between near pure object and reference light. Furthermore, curving the recording medium causes the object information to spread and disperse light wider laterally across the recording medium emulsion on a convex curve. The reference beam incident on the opposite side forms different angles relative to the concave curve of the back surface of the recording medium, dictated by the predetermined radius of curvature, striking the emulsion at varied angles laterally from one beam projection.

It is also believed that when the resultant hologram synthesis on a curved recording medium is flattened for display purposes, it causes the interference fringes that were synthesized on the curved emulsion to be brought together with even closer spacing, which results in a finer resolution power and magnifying the angular spread in the vertical direction.

It has been demonstrated that this method optimizes the vertical viewing range aperture for normalized viewing, plus exhibits the highly sought after characteristics in holography of optimized diffraction efficiency with clarity of imagery for display applications.

With the use of the condensing optics of the present invention, it has also been determined that the depth and size of the finished holographic image can be varied. Finally it has been determined that the resulting hologram can be curved about a vertical axis for display purposes, with the concave side of the hologram facing the viewer. When so displayed, the image appears in front of the film plane.

Whether viewed flat or curved, the resulting hologram is produced in one step and front illuminated (which eliminates bulky back-lit systems).

DESCRIPTION OF THE PREFERRED EMBODIMENT

Figure 1:
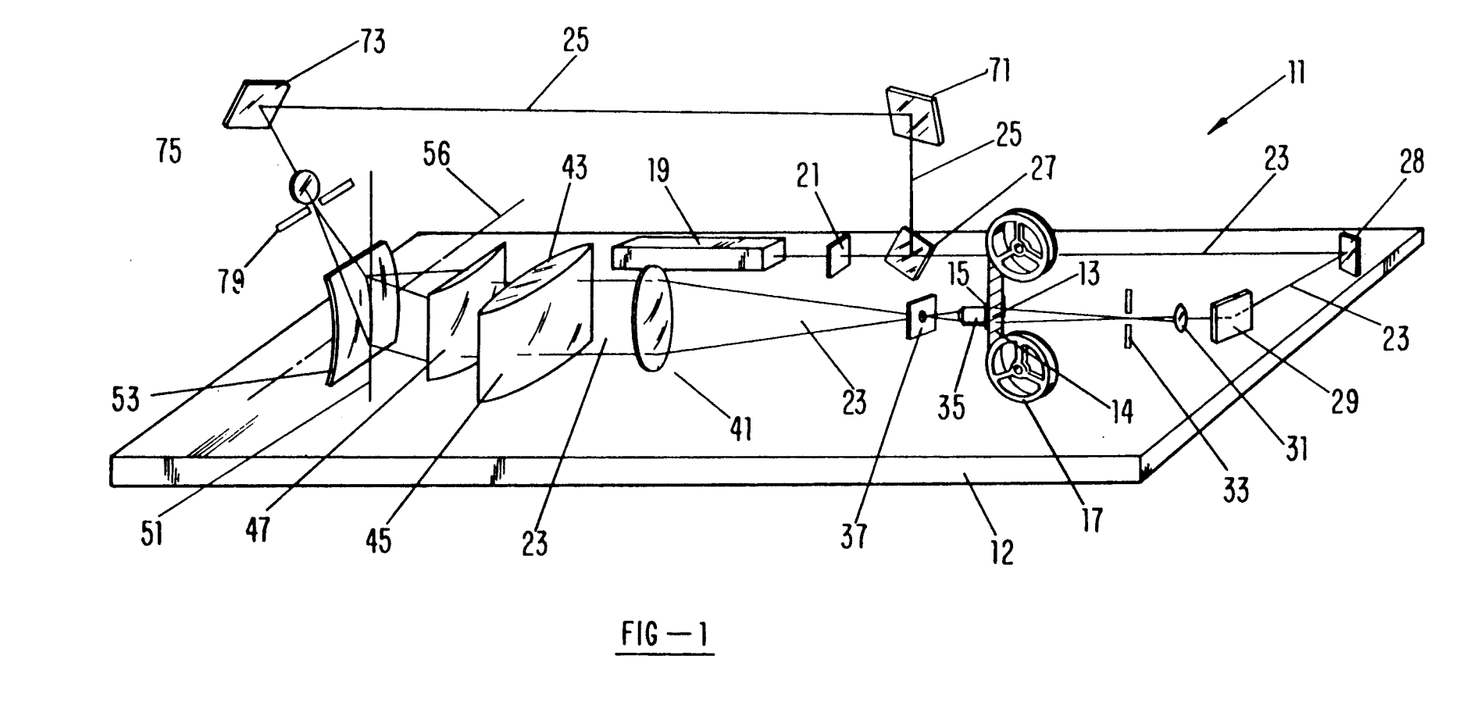
FIG. 1 is a partial perspective and partial schematic view of the preferred embodiment of the invention.

FIG. 1 illustrates the essential components of the preferred embodiment 11, supported on vibration isolation table 12. Individual transparency 13, of film strip 14, is held in film gate 15 of a conventional film transport system 17 and illuminated with coherent, and preferably polarized light from laser 19, conveyed through a shutter 21 and split into object beam 23 (sometimes referred to as the subject beam) and reference beam 25 by a conventional variable density element 27, such as a Jodon VAB-200 circular wedge, which adjusts the object beam 23 and reference beam 25 to the required predetermined intensity ratio at the recording medium. The object beam 23 is directed toward film transport system 17 via conventional mirrors 28 and 29 and lens 31 (of conventional design) that brings beam 23 to a focal point where a spatial filter 33 is positioned. Filter 33, filters the light to cause a uniform illumination of transparency 13 at the film gate 15. After passing through transparency 13, beam 23 is brought to a second focus by spherical projection lens system 35 where another spatial filter 37 can be placed at focus, to eliminate unwanted aberrations from the image on the transparency.

Figure 2:
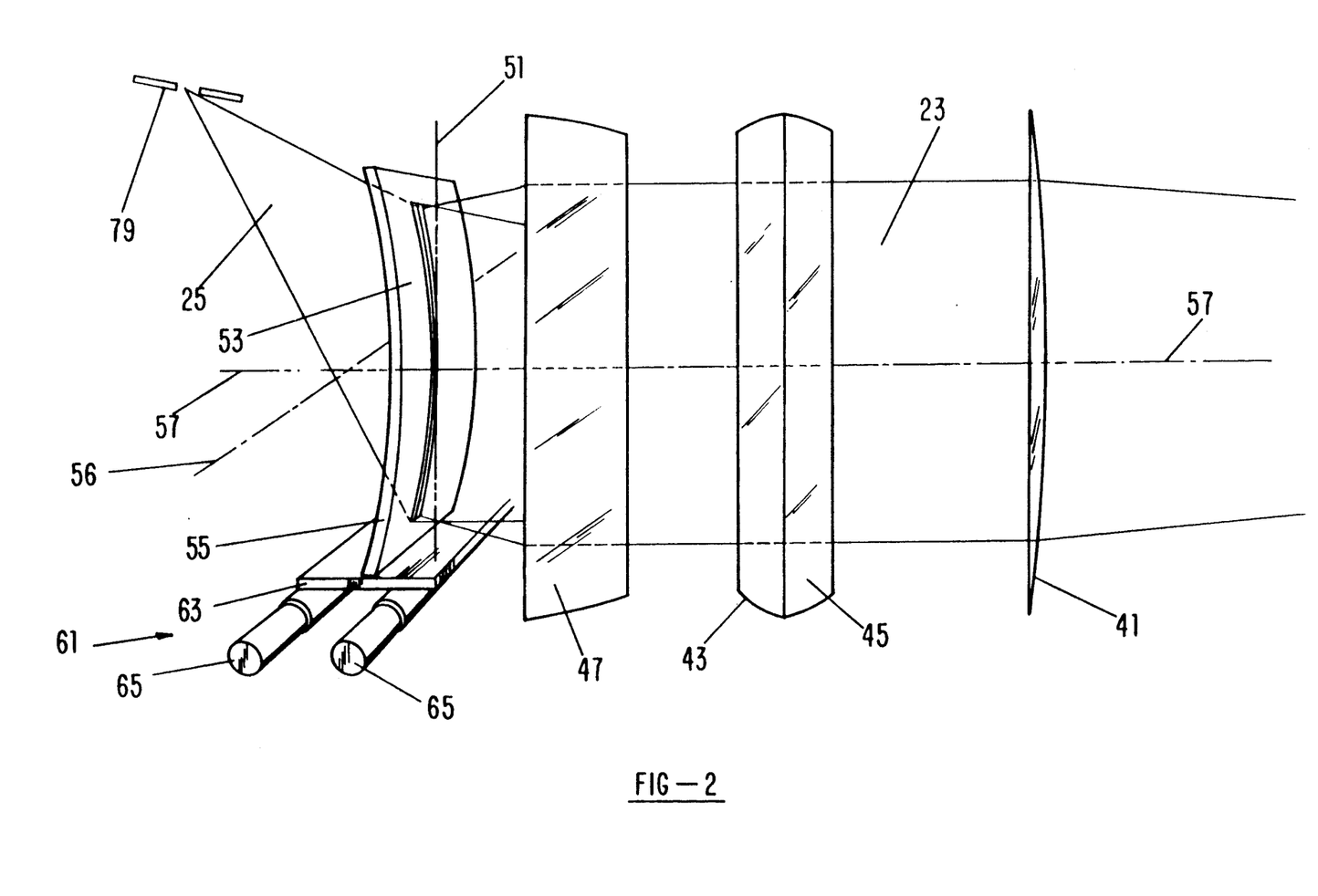
FIG. 2 is an enlarged perspective view of the condensing optics and holographic recording medium and its associated support structure.
Figure 3:
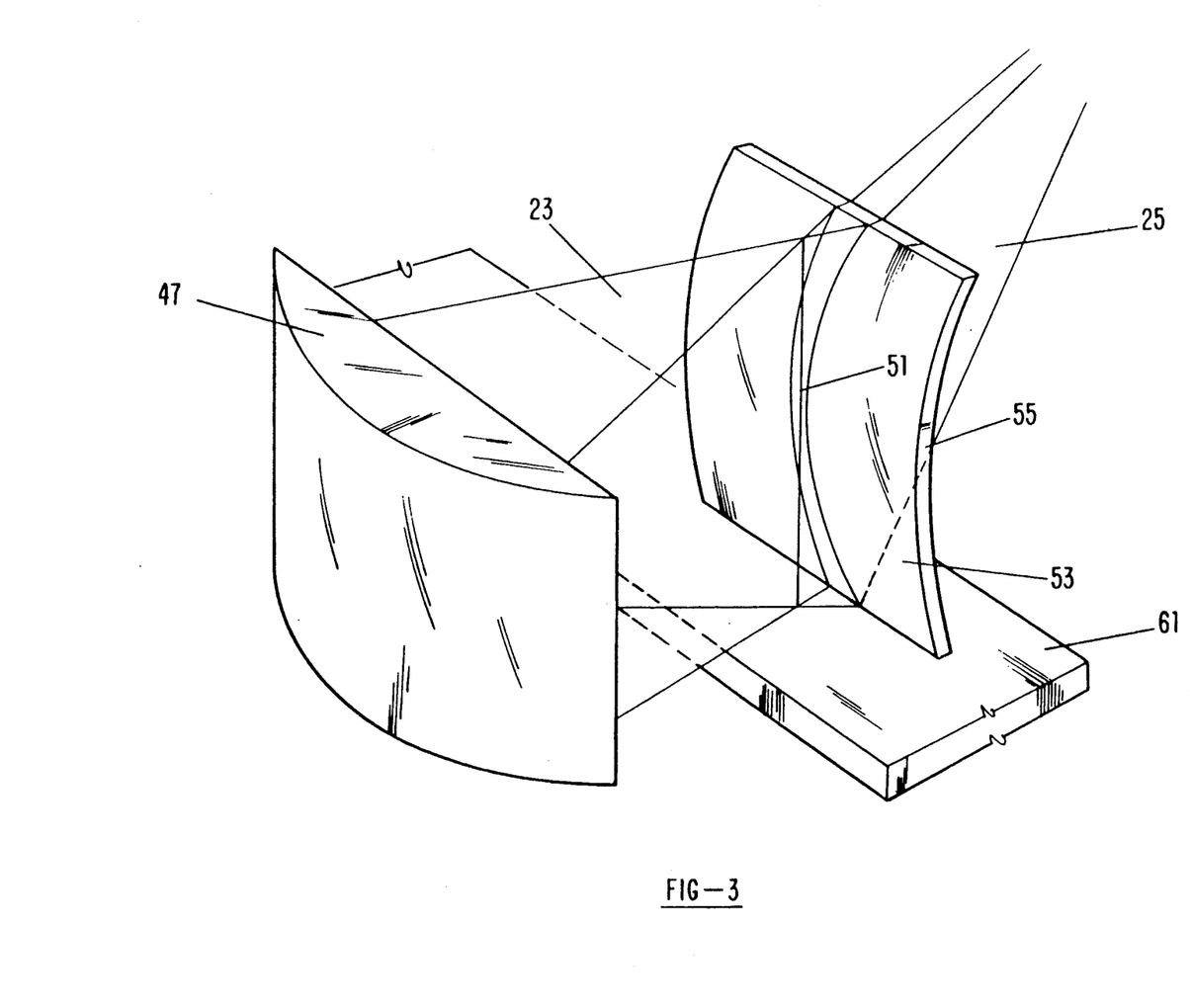
FIG. 3 is a further enlarged perspective view of the structure of FIG. 2 showing one of the preferred relationships between the focal line produced by the condensing optics and the front surface of the holographic recording medium.

After the beam passes through filter 37 it diverges to a first large aperture horizontal low focal length cylindrical lens 43 where focusing of the image on transparency 13 must be done (i.e., focused in a plane which is perpendicular to the optical axis of beam 23 and which touches the front surface 45 of lens 43). Optimally, a collinator lens 41 may be interposed between filter 37 and lens 43 to transform the beam into a parallel wave front. Since proper focusing of the image on transparency 13 will effect the resultant hologram, the image on transparency 13 is focused by projection lens system 35 on the face 45 of large aperture lens 43 by temporarily interrupting beam 23 with a screen (not shown) that is placed so that the image of transparency 13 is projected on it. Accurate focusing is difficult at this stage if the image information is distorted by a projection lens, such as described in U.S. Pat. Nos. 4,206,965, 4,411,489, 4,364,627 (noting column 5, lines 13-16), and U.S. Pat. No. 4,429,946. Once proper focusing is accomplished the screen is removed and object beam 23 continues through first horizontal cylindrical low focal length lens 43, where it begins to converge. Beam 23 then passes through a second cylindrical lens 47 and is converged vertically to a line focus 51, as best illustrated in FIGS. 2 and 3.

The two cylindrical lenses 43 and 47 enhance image fidelity better than would be the case for a smaller cylindrical lens system, where noise would be greatly magnified. Lenses 43 and 47 also provide more flexibility than the single double convex oil lens previously used at Multiplex. The use of these two lenses also gives easy focus control of converging line focus 51. The placement of these lenses greatly effects depth of field of the resultant hologram.

Hologram recording medium 53 can be holographic film, photoconductor-thermoplastic recording media, dichromated gelatin films, photochromics, photopolymers, photoresists and Itek Prom. As is apparent from FIG. 2, recording medium 53 is supported on platen 55, which is positioned in the path of object beam 23. Platen 55 is formed of optically transparent material. As is also evident from the drawings, particularly FIGS. 2, 3 and 4, platen 55 and recording medium 53 are curved about an axis 56, that is perpendicular to the optical axis 57 of object beam 23 and perpendicular to (but not intersecting) line focus 51, to form a convex front surface. Recording medium 53 is placed along the optical axis 57 of beam 23 so that line focus 51 is in front of the front surface of recording medium 53, as illustrated in FIG. 3, or just behind the back concave surface of recording medium 53 (not illustrated). Platen 55 is secured to support 61, including support frame 63 which, in turn, is mounted on a linear track 65 for movement in directions parallel to the axis 56. This movement, in predetermined amounts, is accomplished by a conventional linear incremental drive system (not shown). As is evident from FIG. 2, recording medium 53 is maintained in surface contract with the front surface of platen 55. This can easily be accomplished by sandwiching between platen 55 and a mating platen (not shown).

As those skilled in the art will appreciate, the optical geometry for the formation of a reflection integral hologram requires that reference beam 25 passes through the holographic medium 53 from the side opposite to that of the information in object beam 23. Therefore, placement of object beam lens system relative to the front surface of medium 53 does not effect reference beam 25 geometry.

Figure 4:
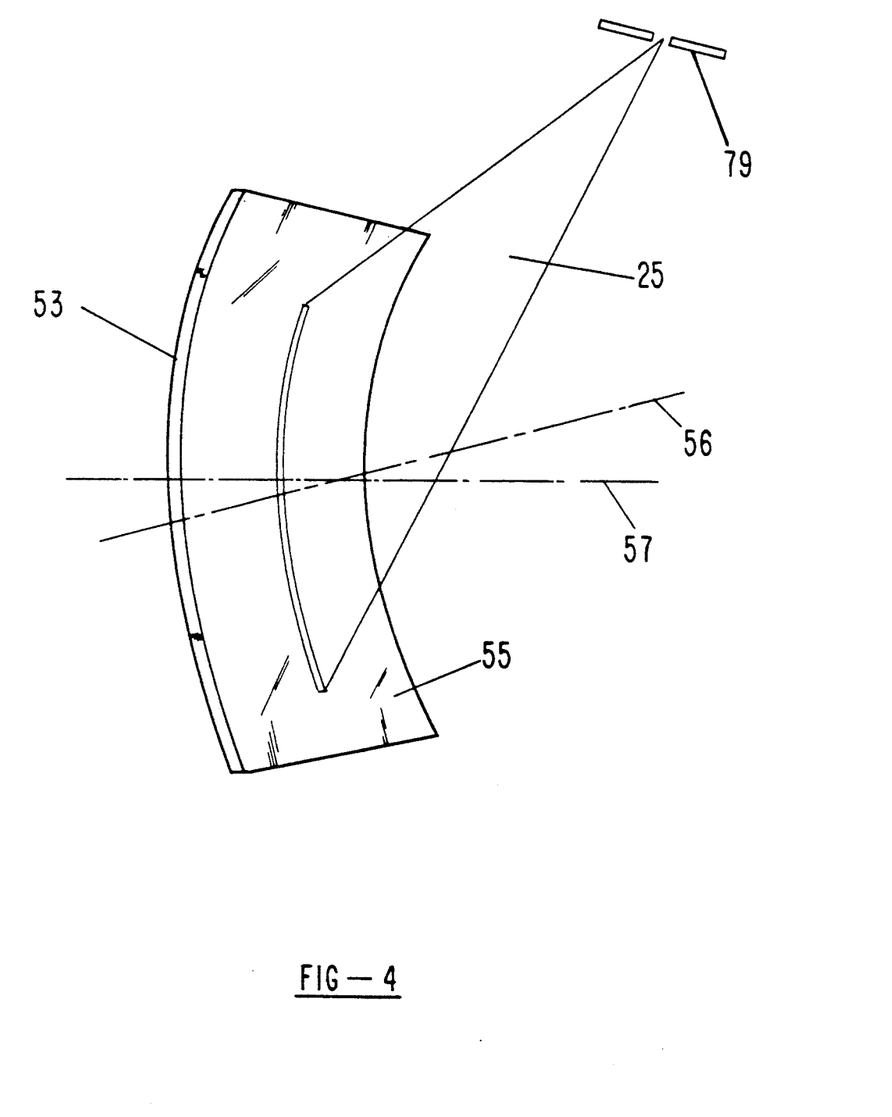
FIG. 4 is a perspective view of the back surface of the holographic recording medium and the reference beam.
Figure 5:
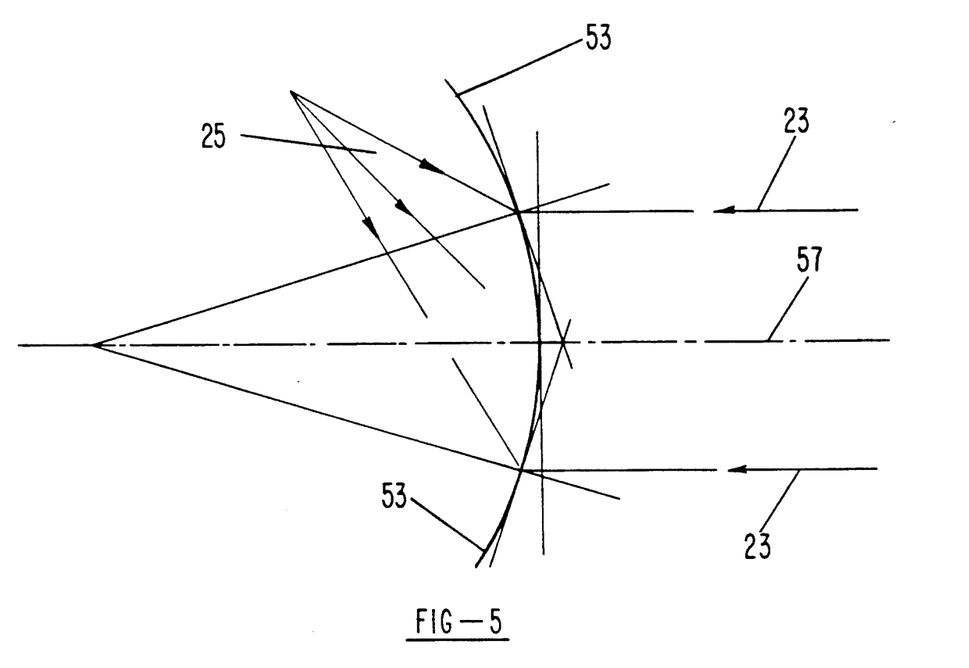
FIG. 5 is an optical schematic illustrating the relationship between the object beam, the reference beam and the holographic medium during the recording process.

As is evident from FIG. 1, the reference beam 25 is, via mirrors 71 and 73, directed toward the back convex surface of recording medium 53. Mirror 73 is spaced a predetermined distance behind recording medium 53 to give the proper angle of incidence relative to recording medium 53. Spherical lens 75 has a predetermined tilt (i.e., the principal optical axis of lens 75 intersects the optical axis of beam 25 at a predetermined angle), depending on the amount of beam fanning desired relative to the principle axis of reference beam 25, so that beam 25 converges to a slit focus where a slit filter 79 is positioned. Beam 25 projects through filter 79 as a narrow, filtered vertical strip incident on the back surface of concave curved transparent recording medium 53, as best illustrated in FIG. 4. Alternately, other conventional slit focusing optical techniques may be utilized. The object beam 23 and reference beam 25 are superimposed, approaching each other from opposite sides of recording medium 53, as illustrated in FIG. 5.

Figure 6:
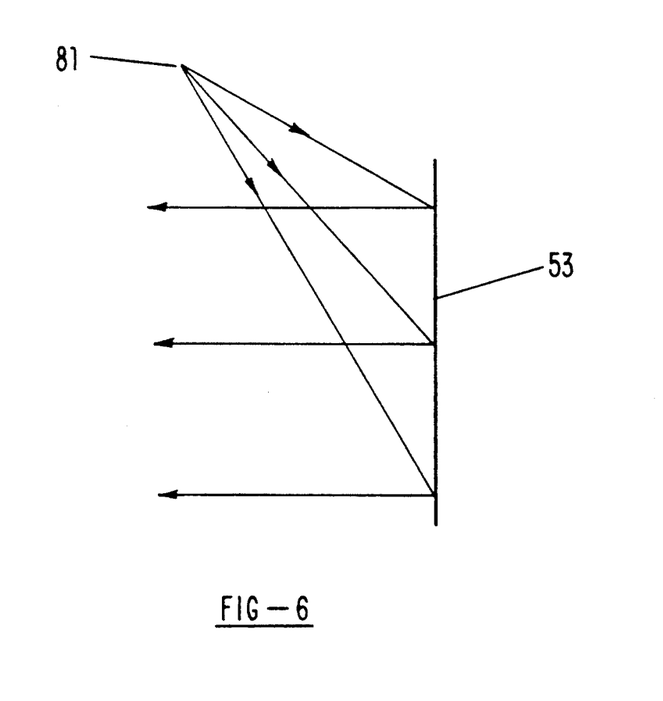
FIG. 6 is an optical schematic illustrating the holographic medium in its viewing on display mode, together with a source of illumination.

The unique curve of platen 55 and recording medium 53 relative to reference beam 25 gives the advantage of forming the standing waves through the curved emulsion on recording medium 53 increasing the imaging information which, as is evident from FIG. 6, increases the vertical viewing range when the resultant hologram is viewed flat. Secondly, the object beam 23 is uninterrupted by scattering elements, placed in beam path as in other systems such as disclosed in U.S. Pat. Nos. 4,206,965, 4,411,489, and 4,834,476. Thus only the original object information is conveyed to recording medium 53, causing mutual coherence with reference beam 25, to greatly increase the amplitude of the wave formation and satisfying the Bragg condition required for proper reflection integral hologram synthesis. Thirdly, the curved platen 55 causes the line focus 51 to form different angles incident on recording medium 53, dictated by the predetermined radius of curvature of platen 55. This curvature eliminates the need for multiple mechanized reference beam positions, such as are required by the prior art.

In operation, the film transport system 17 positions a transparency 13 in film gate 15 while shutter 21 is closed. When the system is vibration free, shutter 21 is opened for a predetermined time to convey both the information carried by object beam 23 and reference beam 25 onto a narrow slit of the superimposed beams onto opposite sides of recording medium 53. The beam from laser 19 is then blocked with shutter 21, and the film 14 is advanced to the next transparency. At the same time, platen 55 and recording medium 53 are advanced by support 61 and the next hologram slit is exposed. For a 8×10 recording medium 53, this exposure process is typically repeated 1000 times.

After development of recording medium 53, the resulting reflection integral hologram is viewed flat, as illustrated in FIG. 6, illuminated with a point light source 81 that may include a vertical filament clear conventional light bulb placed in a position corresponding to the position of reference beam 25 during recording synthesis.

Figure 10:
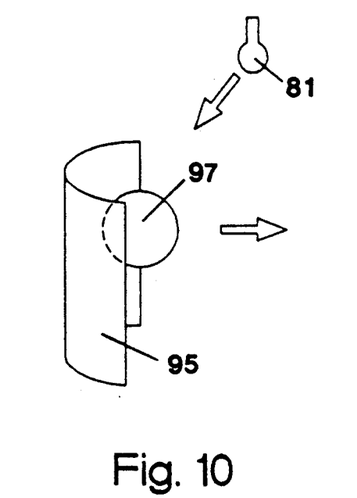
FIG. 10 is a perspective view of the schematic of FIG. 8B showing the projected high definition hologram.

In addition to being viewed flat, the finished hologram may be mounted on a support curved about a vertical axis, with the concave side of the support facing the viewer. When mounted on such a support the image appears to be in front of the curved surface; in contrast to flat mounting, where the image appears to be behind the developed holographic film. When mounted on a curved film support, a high definition image is achieved. As with flat mounting, the hologram is front illuminated as indicated in FIG. 10.

Figure 7A:
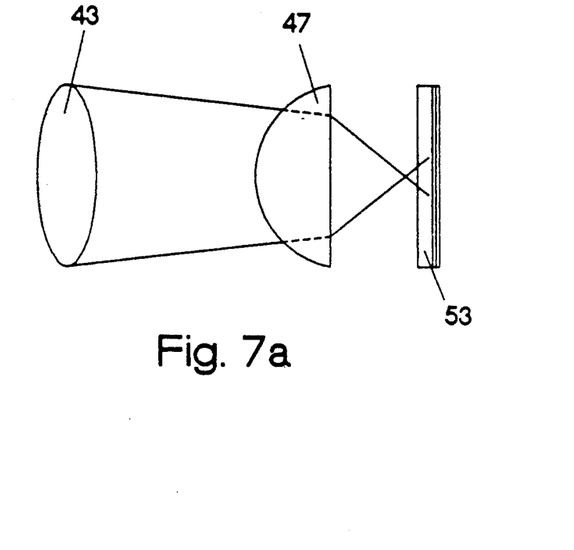
FIG. 7A is a top plain schematic of the condensing optics and curved holographic recording medium of FIG. 2.
Figure 7B:
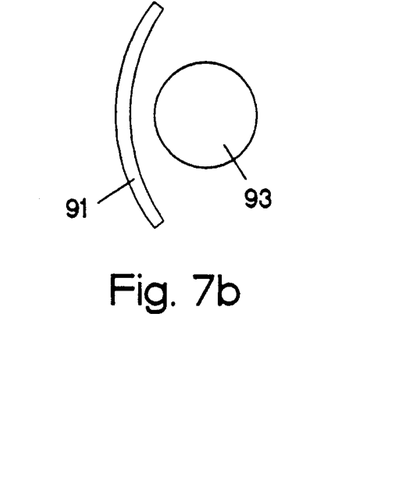
FIG. 7B is a top plain schematic showing the curvature of the hologram support and the position and size of the image obtained with the optical arrangement of FIG. 7A.
Figure 8A:
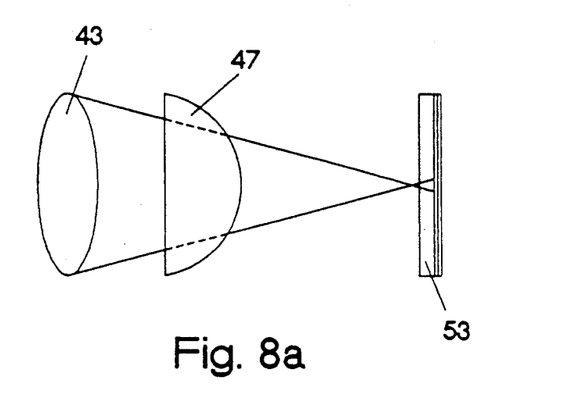
FIG. 8A is a second alternate top plain schematic showing the use of the two condensing lenses, and the position of such lenses relative to the holographic recording medium.
Figure 8B:
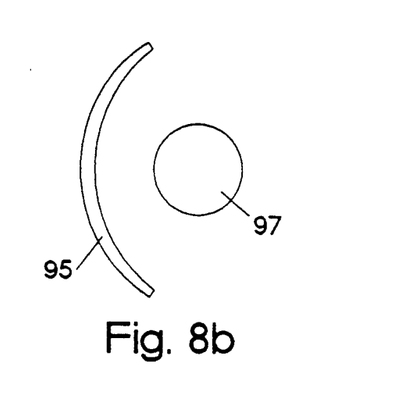
FIG. 8B is a top plain schematic showing the curvature of the hologram support and the position and size of the image obtained with the optical arrangement of FIG. 8A.
Figure 9A:
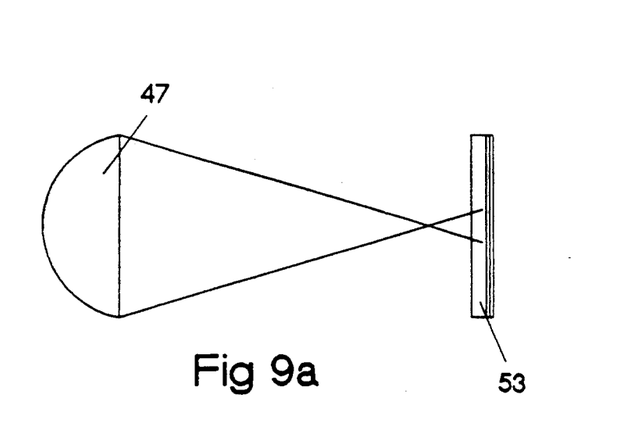
FIG. 9A is an alternate top plain schematic, showing the use of just one of the two condensing lenses of FIGS. 7 and 8, and the position of such lens relative to the holographic recording medium.
Figure 9B:
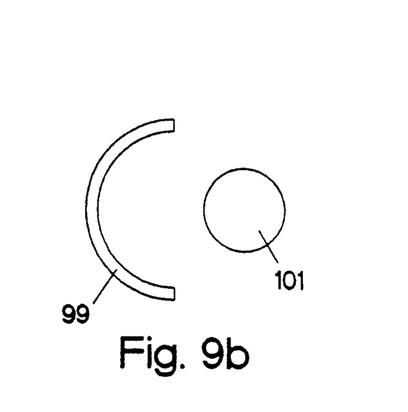
FIG. 9B is a top plain schematic showing the curvature of the hologram support and the position and size of the image obtained with the optical arrangement of FIG. 9A.

With reference to FIGS. 7A, 7B, 8A, 8B, 9A and 9B, the number and position of the cylindrical condensing lens system affects both the curvature required for the support, and the depth and the size of the resulting image. The hologram produced by the condensing optics, as set up in FIGS. 1-4 and 7A, will produce a holographic image 93 in front of the film plain, if support 91 has a shallow curvature, as illustrated in FIG. 7B. With the optics positioned as illustrated in FIG. 8A, curved support 95 is required, with the curvature of support 95 is greater than the curvature of support 91 (i.e. $r_{91} > r_{95}$). The image 97 will appear to have greater depth, but will be smaller in size than image 93. Finally, by using only lens 47, as illustrated in FIG. 9A, greater image depth is achieved, as illustrated in FIG. 9B. The curvature of support 99 is steeper than the curvature of support 95; the size of image 101 is smaller than image 97. Thus, the closer the condensing optics to film 53, the larger the resulted image and the shallower the depth of field. Conversely, the further the condensing optics from film 53, the greater the depth and the smaller the viewed image.

Figure 11:
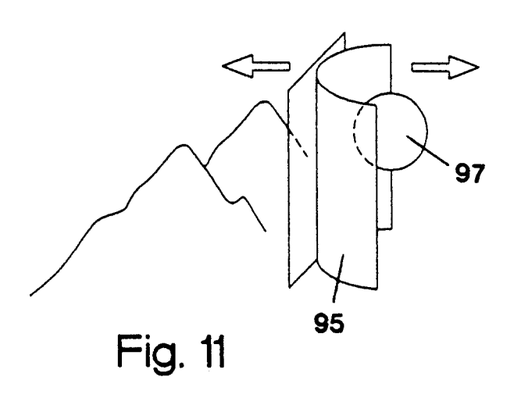
FIG. 11 is a perspective schematic showing the use of two holograms of the present invention; one supported flat, the other concave toward the viewer.

As illustrated in FIG. 11, flat and curved holograms can be combined to produce imaging in which, for instance, the image of an object is in front while the background imagery is behind the exposed holographic films.

Figure 12:
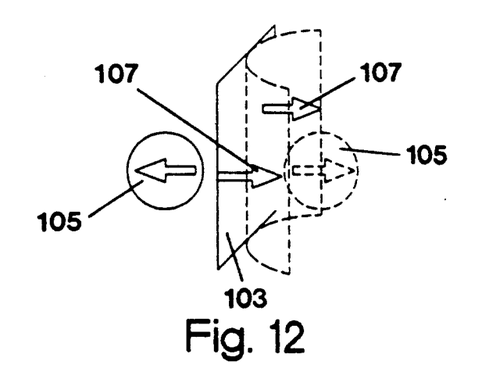
FIG. 12 is a perspective schematic of a hologram support which is movable from a position in which the film support surface is flat to a position where the film support surface is concave towards the viewer.

In FIG. 12 hologram support 103 is flexible about a vertical axis (not shown) for movement from a position where it is a planor surface with image 105 behind the film plane, to curved about the vertical axis (as illustrated in phantom lines) where image 105 is in front of the film plane. The bending of support 103 may be accomplished by any suitable mechanical, electrical or electro-mechanical mechanism (as indicated by arrows 107).

As will be appreciated by those skilled in the art, many modifications can be made to the preferred embodiment without affecting the scope of the invention. For instance, instead of transparencies carried on film strip 14, a video kinescope or any appropriate conventional visual data projector can be used, including a single transparency from conventional cinematography, computer synthesis, photography or video projection. The subjects can provide sequential horizontal perspective information, which is recorded on individual frames of the film through various filming techniques.

Whereas the drawings and accompanying description have shown and described the preferred embodiment of the present invention, it should be apparent to those skilled in the art that other various changes may be made in the form of the invention without affecting the scope thereof.

I claim:

1. A method of producing integral reflection holograms comprising the steps of:
   (a) providing information in the form of one or more transparencies;
   (b) illuminating said information with an object beam of non-diffused light, said object beam having an optical axis;
   (c) bringing the image of said information to substantially a line focus;
   (d) placing a holographic image recording medium, curved about an axis to form oppositely facing convex and concave surfaces, in the path of said object beam close to said line focus, with said convex surface of said recording medium facing said object beam and with said axis of curvature of said surfaces perpendicular to said line focus; and
   (e) exposing said concave surface of said holographic image recording medium with a reference beam, which is superimposed over the object beam at said holographic image recording medium.

2. The method of claim 1, wherein said axis of curvature of said surfaces is positioned to intersect said optical axis of said object beam at 90°.

3. The method of claim -2, wherein said axis of curvature of said surfaces does not intersect said line focus.

4. The method as set forth in claim 1 wherein, said holographic image recording medium is exposed to a sequence of said transparencies, said holographic image recording medium being moved in a direction parallel to said axis of curvature of said surfaces after each successive exposure.

5. The method as set forth in claim 4, wherein after exposure said holographic image recording medium is viewed flat and said hologram appears behind said recording medium.

6. The method as set forth in 4, wherein, after exposure, said holographic image recording medium is supported for viewing on the concave side of a surface curved about a vertical axis, whereby said hologram appears in front of said holographic image recording medium.

7. The method as set forth in claim 6, wherein after exposure, said holographic image recording medium can be viewed simultaneously with a second exposed holographic image recording medium; one of said mediums being flat, the other of said mediums being curved toward a viewer.

8. The method as set forth in claim 4, further including the step of supporting said exposed holographic recording medium on a flexible surface means whereby said exposed holographic image recording medium can be viewed flat or curved toward a viewer.

9. The method as set forth in claim 1 wherein said line focus is accomplished by cylindrical lens means and wherein said information is focused in a plane which is perpendicular to said optical axis of said object beam and adjacent to said convex surface.

10. The method of claim 9, wherein the position and orientation of said cylindrical lens means relative to said convex surface is varied, to vary the size of the image produced by the hologram and its depth relative to said holographic image recording medium.

11. The method as set forth in 10, wherein, after exposure, said holographic image recording medium is supported for viewing on the concave side of a surface curved about a vertical axis, whereby said holographic image appears in front of said holographic image recording medium.

12. The method as set forth in claim 11, wherein the curvature of said viewing support surface is varied depending upon said orientation and position of said cylindrical lens means.

13. The method of claim 1, wherein said reference beam, when it is incident to said concave surface, is in the form of a narrow filtered strip.

14. The method of claim 13, wherein said reference beam is maintained in a fixed location during said exposure step.

15. Apparatus for forming reflection holograms, said apparatus comprising:
   (a) means for providing a beam of coherent light;
   (b) means for dividing said beam into an object beam, having an object beam axis, and a reference beam, having a reference beam axis;
   (c) means for supporting a transparency having an image thereon along said object beam axis in the path of said object beam;
   (d) means, positioned along said object beam axis, for converging said object beam and said image to a line focus perpendicular to said object beam axis;
   (e) means, positioned along said object beam axis, for supporting a recording medium adjacent to the position of said line focus, said recording medium and said means for supporting said recording medium being curved about an axis which is perpendicular to both said object beam axis and said line focus, to form both convex and concave sides, said convex sides of both said recording medium and said means for supporting said recording medium facing toward said means for supporting said transparency; and
   (f) means for directing said reference beam to said concave surface of said recording medium in superimposed relation to said object beam.

16. The apparatus as set forth in claim 15, wherein said means for converging said object beam includes at least one cylindrical lens.

17. The apparatus as set forth in claim 16, wherein the position of said cylindrical lens along said object beam axis and relative to said convex side of said means for supporting said recording medium can be varied.

18. The apparatus as set forth in claim 17, further including a second cylindrical lens.

19. The apparatus as set forth in claim 15, further including apparatus for supporting said recording medium after exposure.

20. The apparatus as set forth in claim 19, wherein said apparatus for supporting includes a flat support surface.

21. The apparatus as set forth in claim 20, further including means secured to said flat support surface for curving said surface towards a viewer.

22. The apparatus as set forth in claim 19, wherein said apparatus for supporting is curved about a vertical axis, with the concave side facing toward a viewer.

* * * * *